United States Patent
Kobayashi et al.

(10) Patent No.: US 9,243,671 B2
(45) Date of Patent: Jan. 26, 2016

(54) FIXED TYPE CONSTANT VELOCITY UNIVERSAL JOINT

(75) Inventors: Tomoshige Kobayashi, Iwata (JP); Minoru Ishijima, Iwata (JP); Kisao Yamazaki, Iwata (JP); Aiko Ishikawa, Iwata (JP)

(73) Assignee: NTN CORPORATION, Osaka (JP)

(*) Notice: Subject to any disclaimer, the term of this patent is extended or adjusted under 35 U.S.C. 154(b) by 68 days.

(21) Appl. No.: 13/497,080

(22) PCT Filed: Sep. 22, 2010

(86) PCT No.: PCT/JP2010/066390
§ 371 (c)(1),
(2), (4) Date: Mar. 20, 2012

(87) PCT Pub. No.: WO2011/048906
PCT Pub. Date: Apr. 28, 2011

(65) Prior Publication Data
US 2012/0184382 A1    Jul. 19, 2012

(30) Foreign Application Priority Data
Oct. 22, 2009    (JP) .................... 2009-243725

(51) Int. Cl.
*C10M 101/02*    (2006.01)
*F16D 3/224*    (2011.01)
(Continued)

(52) U.S. Cl.
CPC ........... *F16D 3/2237* (2013.01); *C10M 101/02* (2013.01); *C10M 111/04* (2013.01);
(Continued)

(58) Field of Classification Search
USPC .................................. 464/15, 906; 508/552
See application file for complete search history.

(56) References Cited

U.S. PATENT DOCUMENTS 2,985,645 A * 5/1961 Garbus et al. ................ 549/245
5,589,444 A * 12/1996 Hatakeyama ............ 508/552 X
(Continued)

FOREIGN PATENT DOCUMENTS

CN    1069691    8/2001
CN    1321733    11/2001
(Continued)

OTHER PUBLICATIONS

Grease—Its Components and Characteristics. Technical Topic [online]. Mobil Industrial, 2009 [retrieved on Mar. 17, 2013]. Retrieved from the Internet: <URL: www.mobilindustrial.com/IND/English/Files/tt-components-and-characteristics-of-grease.pdf>.*

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint includes an outer joint member, an inner joint member, a plurality of balls for transmitting torque provided between track grooves of the outer joint member and track grooves of the inner joint member, and a cage for retaining the balls. Grease is enclosed in the fixed type constant velocity universal joint which includes a thickener and a lubricant component which is constituted by base oil. The grease contains 90% by mass or more of paraffinic mineral oil with respect to the total mass of the lubricant component of the grease, and 3 to 8% by mass of the thickener with respect to the total mass of the components of the grease.

15 Claims, 6 Drawing Sheets (51) Int. Cl.
*F16D 3/2237* (2011.01)
*C10M 111/04* (2006.01)
*F16D 3/2245* (2011.01)
*F16D 3/223* (2011.01)

(52) U.S. Cl.
CPC ...... *F16D3/2245* (2013.01); *C10M 2203/1025* (2013.01); *C10M 2203/1065* (2013.01); *C10M 2205/028* (2013.01); *C10M 2205/173* (2013.01); *C10M 2207/2805* (2013.01); *C10M 2207/285* (2013.01); *C10M 2215/1026* (2013.01); *C10M 2219/068* (2013.01); *C10M 2223/045* (2013.01); *C10N 2220/022* (2013.01); *C10N 2230/08* (2013.01); *C10N 2230/36* (2013.01); *C10N 2240/046* (2013.01); *C10N 2250/10* (2013.01); *F16D 2003/22309* (2013.01)

(56) References Cited

U.S. PATENT DOCUMENTS

| | | | |
|---|---|---|---|
| 6,120,382 A * | 9/2000 | Sone et al. | 464/906 X |
| 6,267,682 B1 | 7/2001 | Sone et al. | |
| 6,656,890 B1 * | 12/2003 | Fish et al. | |
| 8,172,689 B2 * | 5/2012 | Kobayashi et al. | 464/15 |
| 8,267,802 B2 * | 9/2012 | Kobayashi et al. | 464/15 X |
| 2002/0032064 A1 | 3/2002 | Sone et al. | |
| 2008/0176776 A1 | 7/2008 | E. et al. | |
| 2010/0173715 A1 | 7/2010 | Hoshino et al. | |

FOREIGN PATENT DOCUMENTS

| | | |
|---|---|---|
| CN | 1419061 | 5/2003 |
| EP | 0 811 675 | 12/1997 |
| EP | 2 192 315 | 6/2010 |
| JP | 61-19212 | 6/1986 |
| JP | 5-75525 | 10/1993 |
| JP | 2008-150579 | 7/2008 |
| WO | 2009/041280 | 4/2009 |

OTHER PUBLICATIONS

International Search Report issued Dec. 14, 2010 in International (PCT) Application No. PCT/JP2010/066390.

International Preliminary Report on Patentability and Written Opinion of the International Searching Authority issued May 24, 2012 in International (PCT) Application No. PCT/JP2010/066390.

Chinese Office Action, with partial English translation, issued Jan. 6, 2014 in corresponding Chinese Patent Application No. 201080047444.0.

* cited by examiner

FIXED TYPE CONSTANT VELOCITY UNIVERSAL JOINT

TECHNICAL FIELD

The present invention relates to a fixed type constant velocity universal joint which is used in power transmission systems of vehicles such as automobiles and allows only the angular displacement between two shafts on the driving side and the driven side, and more particularly, to a fixed type constant velocity universal joint which can prevent stick slip from occurring due to lack of lubricity even during use in an extremely cold region.

BACKGROUND ART

Figure 6:
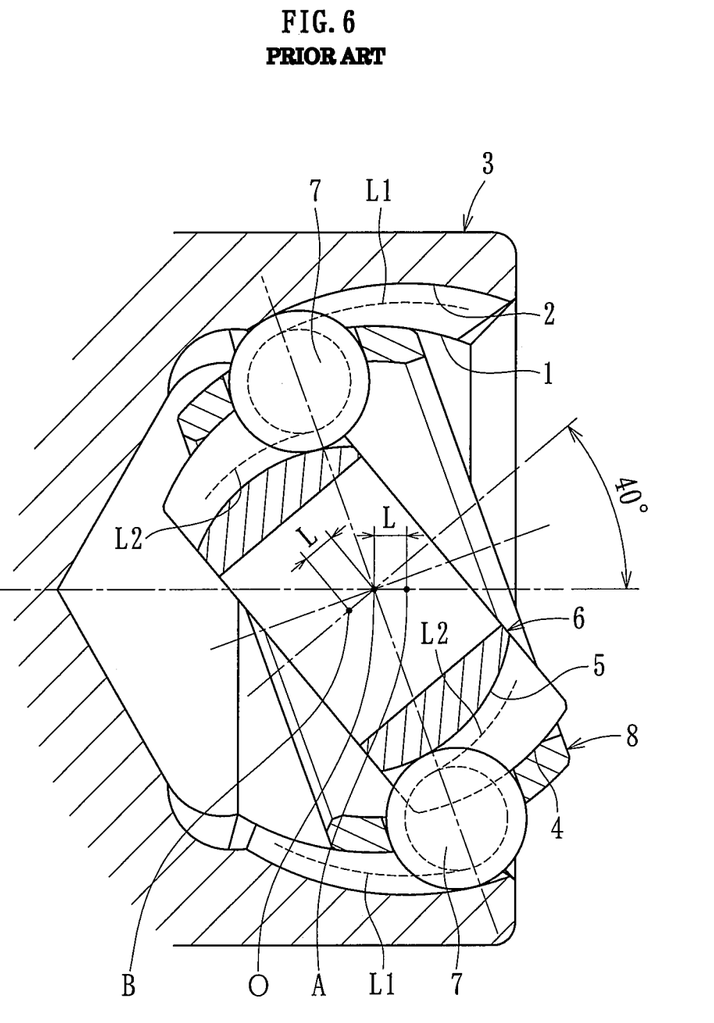
FIG. 6 is a longitudinal sectional view showing the contacted state of track grooves and balls when a conventional fixed type constant velocity universal joint having six balls forms a high operating angle.

As shown in FIG. 6, a Rzeppa type constant velocity universal joint which is a fixed type constant velocity universal joint includes an outer joint member 3, an inner joint member 6, balls 7, and a cage 8. The outer joint member 3 has a spherical inner surface 1 in which a plurality of track grooves 2 are formed in the circumferential direction at regular intervals and along the axial direction. The inner joint member 6 has a spherical outer surface 4 in which track grooves 5 opposite the track grooves 2 of the outer joint member 3 are formed in the circumferential direction at regular intervals and along the axial direction. The balls 7 for transmitting torque are provided between the track grooves 2 of the outer joint member 3 and the track grooves 5 of the inner joint member 6. The cage 8 for retaining the balls 7 is arranged between the spherical inner surface 1 of the outer joint member 3 and the spherical outer surface 4 of the inner joint member 6. The outer circumference of the outer joint member 3 and the outer circumference of a shaft coupled to the inner joint member 6 are covered by a boot to enclose grease as a lubricant in the joint (not shown).

As shown in FIG. 6, the center of curvature of the spherical inner surface 1 of the outer joint member 3 and the center of curvature of the spherical outer surface 4 of the inner joint member 6 are both formed at a center O of the joint. On the contrary, a center of curvature A of the track grooves 2 of the outer joint member 3 and a center of curvature B of the track grooves 5 of the inner joint member 6 are offset from the center O of the joint by an equal distance L in the axial direction. With this, when the joint forms an operating angle, the balls 7 are always guided onto a plane which bisects the angle formed between both axes of the outer joint member 3 and the inner joint member 6 to transmit rotational torque at an equal speed between two shafts.

By the way, in an automobile left in an extremely cold region for a long time, the fixed type constant velocity universal joint used for driving the front wheels has a low temperature (e.g., −20° C. or lower) equal to outside-air temperature, and grease enclosed in the fixed type constant velocity universal joint has the same low temperature.

In such a case, immediately after torque is inputted to the fixed type constant velocity universal joint at a high operating angle, stick slip can occur due to temporary lack of lubricity between the track grooves in the joint and the balls guided in the track grooves. When such stick slip occurs, the driver can hear abnormal noises. The abnormal noises are called abnormal noises at low temperatures. Since the abnormal noises at low temperatures disappear immediately when the joint is rotated to generate heat for increasing the temperature therein, the noises become a problem only when the vehicle left in a low temperature environment for a long time is driven and do not become a problem other than immediately after it is driven.

There has been a constant velocity universal joint which can prevent abnormal noises, not the abnormal noises at low temperatures, from occurring (Patent Documents 1 and 2). Patent Document 1 describes a plunging type constant velocity universal joint in which the center portions in the circumferential direction on pocket wall surfaces opposite in the joint axial direction of a cage pocket are ridged, with the ridged portions being as desired ball interference, thereby preventing the abnormal noises from occurring.

Patent Document 2 describes a fixed type constant velocity universal joint in which the clearance between a cage pocket and balls is 0 to 30 μm and grease having a friction coefficient of 0.13 or less is applied to track grooves, thereby preventing hammering sound from occurring.

PRIOR ART DOCUMENTS

Patent Documents

Patent Document 1: Japanese Utility Model Application Publication (JP-Y) No. 61-19212
Patent Document 2: Japanese Utility Model Application Laid-Open (JP-U) No. 5-75525

SUMMARY OF THE INVENTION

Problems to be Solved by the Invention

The conventional techniques do not note stick slip due to temporary lack of lubricity between the track grooves and the balls of the fixed type constant velocity universal joint in the automobile left in an extremely cold region for a long time and abnormal noises at low temperatures, and relates to abnormal noises prevention in the plunging type constant velocity universal joint and hammering sound prevention in the fixed type constant velocity universal joint.

The present inventors have studied the operated state of the fixed type constant velocity universal joint in order to diagnose the cause of the stick slip. In the fixed type constant velocity universal joint shown in FIG. 6, the Rzeppa type constant velocity universal joint having six balls forms an operating angle of 40°. A line L1 is the track of the contact point of the track grooves 2 of the outer joint member 3 and the balls 7, and a line L2 is the track of the contact point of the track grooves 5 of the inner joint member 6 and the balls 7. Both the track grooves 2 and 5 and the balls 7 come in contact with each other with the contact angle, so that the line L1 and the line L2 are in the position away from the groove bottoms of the track grooves 2 and 5. The lengths of the tracks of the contact points of the line L1 and the line L2 are shown in Table 1. The length of the track of the contact point of the line. L1 is 1.57 times the length of the track of the contact point of the line L2, so that the amount of movement of the contact point of the track grooves 2 of the outer joint member 3 and the balls 7 is found to be larger than the amount of movement of the contact point of the track grooves 5 of the inner joint member 6 and the balls 7.

Figure 7:
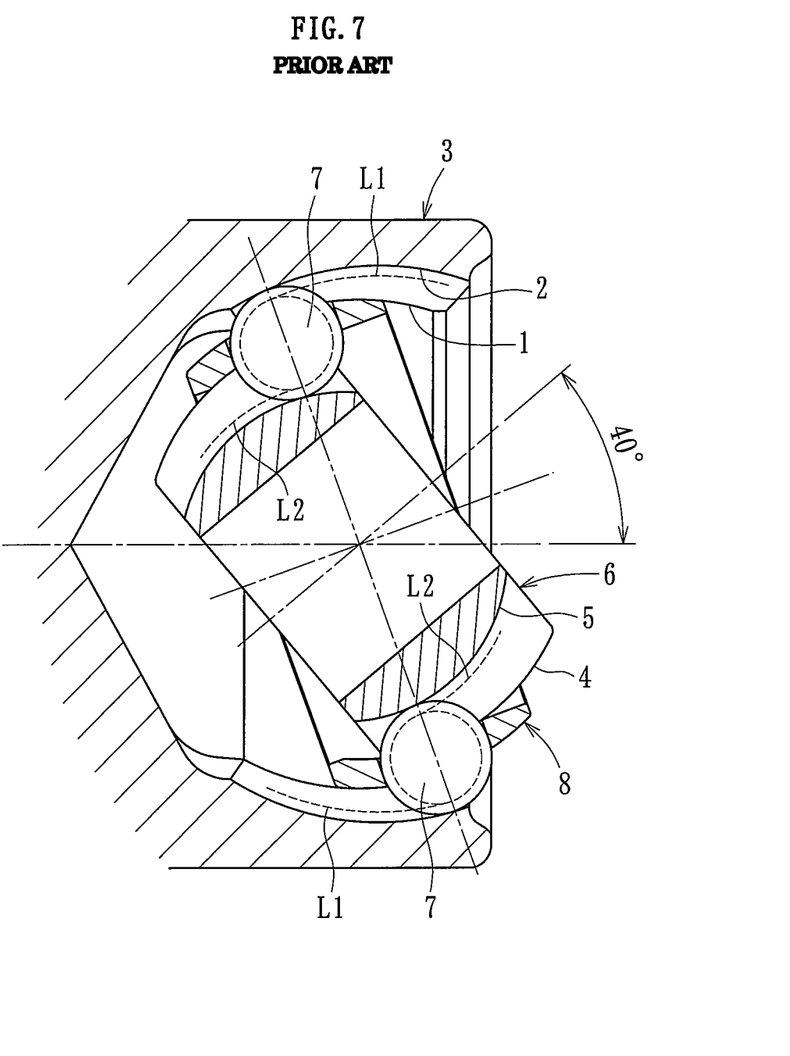
FIG. 7 is a longitudinal sectional view showing the contacted state of track grooves and balls when a conventional fixed type constant velocity universal joint having eight balls forms a high operating angle.

In the fixed type constant velocity universal joint shown in FIG. 7, the Rzeppa type constant velocity universal joint having eight balls forms an operating angle of 40°. As is the case with FIG. 6, the line L1 is the track of the contact point of the track grooves 2 of the outer joint member 3 and the balls 7, and the line L2 is the track of the contact point of the track grooves 5 of the inner joint member 6 and the balls 7. As shown in Table 1, in the Rzeppa type constant velocity universal joint having eight balls, the length of the track of the contact point of the line L1 is 1.53 times the length of the track of the contact point of the line L2, so that the amount of movement of the contact point of the track grooves 2 of the outer joint member 3 and the balls 7 is found to be larger than the amount of movement of the contact point of the track grooves 5 of the inner joint member 6 and the balls 7.

TABLE 1

Ratios of the lengths of the tracks of contact points

|  | Eight balls | Six balls |
| --- | --- | --- |
| Inner joint member (L2) | 1 | 1 |
| Outer joint member (L1) | 1.53 | 1.57 |

As a result, a circumferential speed difference is caused between the contact point of the track grooves 2 of the outer joint member 3 and the balls 7 and the contact point of the track grooves 5 of the inner joint member 6 and the balls 7, so that slip occurs. It is considered that when the inside of the fixed type constant velocity universal joint has an extremely low temperature, grease is unlikely to flow, so that stick slip occurs due to temporary lack of lubricity in the slipping and contacting portion.

In the stick slip, when the fixed type constant velocity universal joint is rotated, heat is generated between the balls and the track grooves and in the spherical contacting portion of the cage and the inner joint member and the outer joint member to increase the temperature of the grease enclosed in the fixed type constant velocity universal joint in an extremely short time, so that the stick slip cannot occur. In addition, it is found that when the temperature in the fixed type constant velocity universal joint is not lowered to −20° C. and when the operating angle of the fixed type constant velocity universal joint is small even at −20° C. or lower, the stick slip cannot occur. It is considered that when the operating angle is small, the relative displacement between the track grooves and the balls is small and the amount of slip due to the circumferential speed difference caused between the contact point of the track grooves of the outer joint member and the balls and the contact, point of the track grooves of the inner joint member and the balls is small.

In view of such a state, as an element influencing the lubricity at an extremely low temperature and under a high surface pressure, the grease enclosed in the fixed type constant velocity universal joint is noted.

An object of the present invention is to provide a fixed type constant velocity universal joint which can prevent stick slip from occurring due to temporary lack of lubricity, and prevent abnormal noises from occurring at low temperatures, even during use in an extremely cold region.

Solutions to the Problems

A fixed type constant velocity universal joint according to the present invention has grease enclosed therein and is provided with an outer joint member having an inner surface in which a plurality of track grooves are formed, an inner joint member having an outer circumferential surface in which a plurality of track grooves are formed, a plurality of balls for transmitting torque provided between the track grooves of the outer joint member and the track grooves of the inner joint member, and a cage for retaining the balls, in which the grease contains 80% by mass or more of paraffinic mineral oil or a mixture of paraffinic mineral oil and synthetic hydrocarbon oil with respect to the total mass of a lubricant component contained as base oil, the paraffinic mineral oil accounts for 70% by mass or more of the total mass of the lubricant component, and the grease contains 3 to 8% by mass Of a thickener with respect to the total mass of the grease, so that the grease prevents abnormal noises from occurring at low temperatures.

In the fixed type constant velocity universal joint, the grease contains 0 to 20% by mass of ester oil with respect to the total mass of the lubricant component contained as the base oil.

Further, in the fixed type constant velocity universal joint, the grease contains 20% by mass or less of naphthenic mineral oil with respect to the total mass of the lubricant component contained as the base oil.

The thickener of the grease is a urea compound and has a consistency numbered 0 to 2.

In the fixed type constant velocity universal joint, each of the track grooves of the outer joint member and the inner joint member is formed only of a circular arc portion in the axial direction.

In the fixed type constant velocity universal joint, each of the track grooves of the outer joint member and the inner joint member includes a circular arc portion and a straight portion in the axial direction.

The number of the track grooves of each of the outer joint member and the inner joint member is six, and the number of the balls provided between the opposite track grooves of the outer joint member and the inner joint member is six.

The number of the track grooves of each of the outer joint member and the inner joint member is eight, and the number of the balls provided between the opposite track grooves of the outer joint member and the inner joint member is eight.

As described above, a circumferential speed difference is caused between the contact point of the track grooves of the outer joint member and the balls and the contact point of the track grooves of the inner joint member and the balls, so that slip occurs. The present inventors have identified and noted the phenomenon in which when the inside of such a fixed type constant velocity universal joint has an extremely low temperature, the grease is unlikely to flow, so that stick slip is likely to occur due to temporary lack of lubricity in the slipping and contacting portion, and have measured the temperature in the fixed type constant velocity universal joint and abnormal noises while the grease is enclosed in the joint, thereby finding the proper grease composition. The present invention is based on such finding.

Effects of the Invention

In the fixed type constant velocity universal joint of the present invention, grease enclosed in the joint contains 80% by mass or more of paraffinic mineral oil or a mixture of paraffinic mineral oil and synthetic hydrocarbon oil with respect to the total mass of a lubricant component contained as base oil, the paraffinic mineral oil accounts for 70% by mass or more of the total mass of the lubricant component, and the grease contains 3 to 8% by mass of a thickener with respect to the total mass of the components of the grease, so that the flowability of the grease at a low temperature can be ensured to prevent stick slip and abnormal noises at low temperatures from occurring.

In other words, typically, the base oil is unlikely to flow at a low temperature, and the thickener in which the base oil is held in the mesh structure by a surface tension functions to inhibit the flowability of the grease at a low temperature. Of the base oil, the paraffinic mineral oil or the synthetic hydrocarbon oil is unlikely to flow at a low temperature like the naphthenic mineral oil, but when subjected to shear from the movement of the inside of the fixed type constant velocity universal joint, the viscosity of the paraffinic mineral oil becomes abruptly smaller than that of the naphthenic mineral oil. When the amount of the thickener is too large, the flowability of the base oil subjected to shear is inhibited, so that it should be smaller. On the contrary, the amount necessary for maintaining the viscous state of the grease needs to be ensured. In addition, the shear stability in a typically used temperature range needs to be ensured. Therefore, the grease needs to contain 3 to 8% by mass of the thickener.

In addition, the grease contains 80% by mass or more of a mixture of paraffinic mineral oil and synthetic hydrocarbon oil with respect to the total mass of a lubricant component contained as base oil, and the paraffinic mineral oil accounts for 70% by mass or more of the total mass of the lubricant component, and in this way, the amount of the paraffinic mineral oil is larger and the amount of the synthetic hydrocarbon oil is smaller, so that cost advantage can be obtained.

Together with the above structure, the thickener is a urea compound and the grease contains 3 to 8% by mass of the thickener, so that the engulfment of the base oil in an extremely cold environment can be reduced, and with this, the flowability of the grease can be ensured, thereby preventing stick slip from occurring.

In addition to the above structure, the grease contains 0 to 20% by mass of ester oil with respect to the total mass of the lubricant component contained as the base oil, so that the proper viscosity can be obtained, and the swelling properties to a boot material which is insufficient due to the large mixing proportion of the paraffinic mineral oil can be moderately ensured. In addition, the amount of ester oil to be mixed is small, which is desirable in cost.

Further, the grease contains 20% by mass or less of naphthenic mineral oil with respect to the total mass of the lubricant component contained as the base oil, so that stick slip at low temperatures and abnormal noises at low temperatures caused thereby can be prevented from occurring.

EMBODIMENTS OF THE INVENTION

Figure 1:
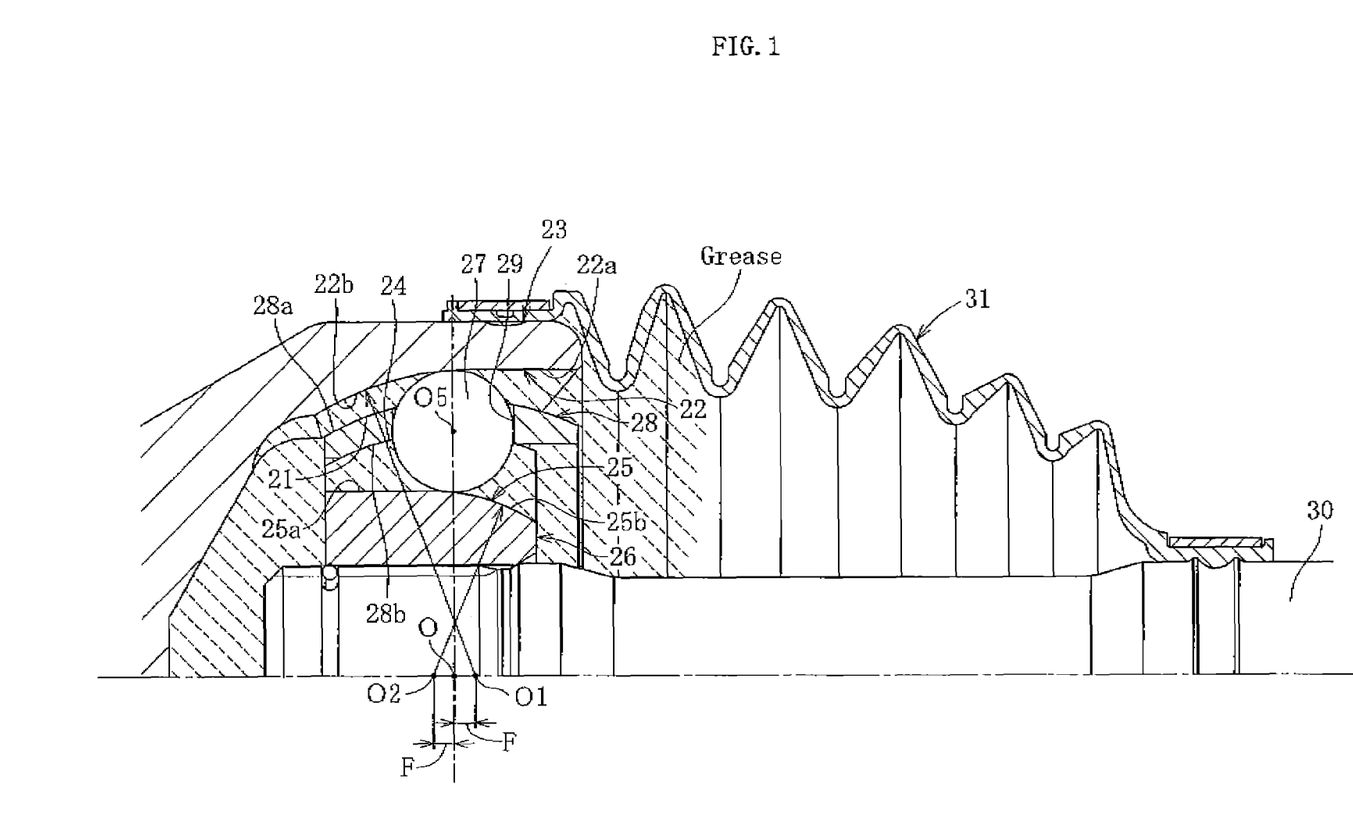
FIG. 1 is a longitudinal sectional view of a fixed type constant velocity universal joint according to the present invention.
Figure 2:
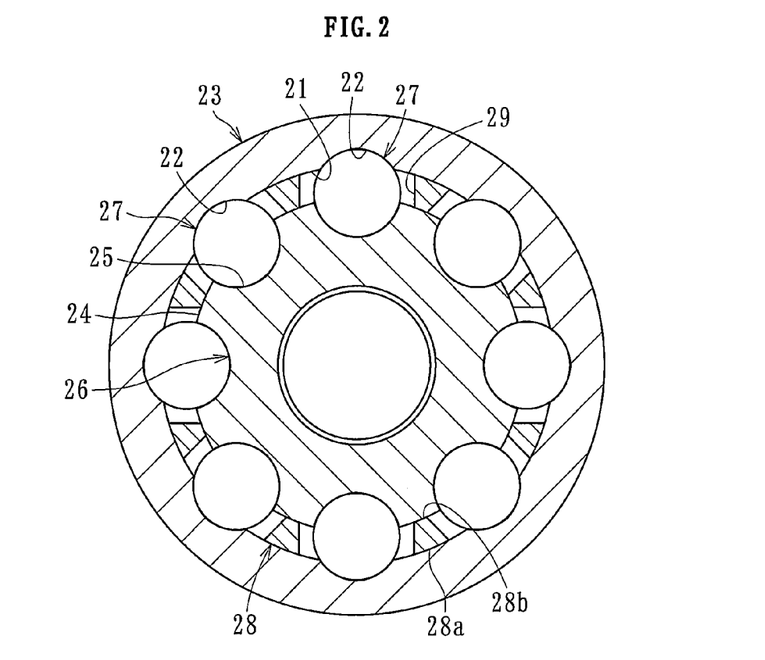
FIG. 2 is a lateral sectional view of the fixed type constant velocity universal joint.
Figure 3:
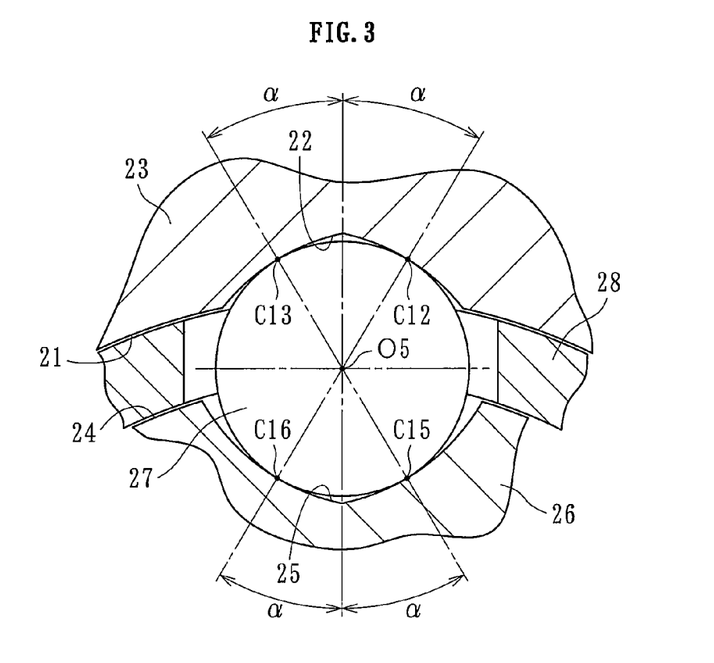
FIG. 3 is a lateral sectional view enlarging an essential portion of FIG. 2.

Hereinafter, an embodiment of the present invention will be described with reference to FIGS. 1 to 4. FIG. 1 is a longitudinal sectional view of a fixed type constant velocity universal joint of the embodiment taken along a plane parallel to an axis, and FIG. 2 is a lateral sectional view of the fixed type constant velocity universal joint taken along a cross section perpendicular to the axis. FIG. 3 shows an essential portion of FIG. 2.

As shown in FIGS. 1 and 2, the fixed type constant velocity universal joint of the present invention includes an outer joint member 23, an inner joint member 26, balls 27, and a cage 28. The outer joint member 23 has a spherical inner surface 21 in which a plurality of track grooves 22 are formed in the circumferential direction at regular intervals and along the axial direction. The inner joint member 26 has a spherical outer surface 24 in which track grooves 25 opposite the track grooves 22 of the outer joint member 23 are formed in the circumferential direction at regular intervals and along the axial direction. The balls 27 for transmitting torque are provided between the track grooves 22 of the outer joint member 23 and the track grooves 25 of the inner joint member 26. The cage 28 for retaining the balls 27 is arranged between the spherical inner surface 21 of the outer joint member 23 and the spherical outer surface 24 of the inner joint member 26. The balls 27 are accommodated in a pocket 29 of the cage 28. The cage 28 has a spherical outer surface 28a fitted onto the spherical inner surface 21 of the outer joint member 23, and a spherical inner surface 28b fitted onto the spherical outer surface 24 of the inner joint member 26.

The center of curvature of the spherical inner surface 21 of the outer joint member 23 and the center of curvature of the spherical outer surface 24 of the inner joint member 26 are formed at a center O of the joint, respectively. The track grooves 22 of the outer joint member 23 include straight portions 22a on the opening side, and circular arc portions 22b on the inner side. On the other hand, the track grooves 25 of the inner joint member 26 include circular arc portions 25b on the opening side, and straight portions 25a on the inner side. A center of curvature O1 of the circular arc portions 22b of the track grooves 22 of the outer joint member 23 and a center of curvature O2 of the circular arc portions 25b of the track grooves 25 of the inner joint member 26 are offset from the center O of the joint by an equal distance F in the axial direction. With this, when the joint forms an operating angle, the balls 27 are always guided onto a plane which bisects the angle formed between both axes of the outer joint member 23 and the inner joint member 26 to transmit rotation at an equal speed between two shafts. The fixed type constant velocity universal joint is of an undercut-free type having eight balls. Further, in this embodiment, the center of curvature (not shown) of the spherical outer surface 28a of the cage 28 is formed on the opening side from the joint center O so as to be offset by a small amount, and the center of curvature (not shown) of the spherical inner surface 28b of the cage 28 is formed on the inner side from the joint center O so as to be offset by a small amount.

FIG. 3 shows an essential portion of FIG. 2, more specifically, is a lateral sectional view of the opposite track grooves 22 and 25 of the outer joint member 23 and the inner joint member 26. As shown in FIG. 3, the balls 27 are angular-contacted with the track grooves 22 of the outer joint member 23 at two points C12 and C13, and are angular-contacted with the track grooves 25 of the inner joint member 26 at two points C15 and C16. An angle α formed between a straight line passing through the ball center O5 and each of, the contact points C12, C13, C15, and C16 and a straight line passing through the ball center O5 and the joint center O is preferably set to 30° to 38°. In the joint having eight balls of this embodiment, each ball has a smaller diameter than that of the conventional joint having six balls, but can obtain durability equal to or better than that of the conventional joint.

In the fixed type constant velocity universal joint of the undercut-free type, like the Rzeppa type constant velocity universal joint having eight balls shown in FIG. 7, the amount of movement of the contact point of the track grooves 22 of the outer joint member 23 and the balls 27 is larger than the amount of movement of the contact point of the track grooves 25 of the inner joint member 26 and the balls 27. Therefore, a circumferential speed difference is caused between the contact point of the track grooves 22 of the outer joint member 23 and the balls 27 and the contact point of the track grooves 25 of the inner joint member 26 and the balls 27, so that slip occurs.

The outer circumference of the outer joint member 23 and the outer circumference of a shaft 30 coupled to the inner joint member 26 are covered by a boot 31 to enclose grease as a lubricant in the joint. The components of the grease are base oil, a thickener, and additives. The grease contains 80% by mass or more of paraffinic mineral oil or a mixture of paraffinic mineral oil and synthetic hydrocarbon oil with respect to the total mass of a lubricant component contained as the base oil.

The thickener is a urea compound and the grease contains 3 to 8% by mass of the thickener. Examples of the urea compound include a diurea compound and a polyurea compound. The diurea compound is obtained by e.g., a reaction of a diisocyanate and a monoamine. Examples of the diisocyanate include phenylene diisocyanate, diphenylmethane diisocyanate, octadecane diisocyanate, decane diisocyanate, and hexane diisocyanate, and examples of the monoamine include octylamine, dodecylamine, hexadecylamine, stearylamine, oleylamine, aniline, p-toluidine, and cyclohexylamine.

The diurea compound desirable for use in the present invention is expressed by the following formula.

R$_1$NH—CO—HH—C$_6$H$_4$—P—CH$_2$—C$_6$H$_4$—P—NH—CO—NHR$_2$ (wherein R$_1$ and R$_2$ are each an aliphatic hydrocarbon radical having 8 to 20 carbon atoms, and R$_1$ and R$_2$ may the same or different.)

The polyurea compound is obtained by e.g., a reaction of a diisocyanate and a monoamine or a diamine. The same diisocyanate and monoamine as those used for generating the diurea compound are used, and examples of the diamine include ethylenediamine, propanediamine, butanediamine, hexanediamine, octanediamine, phenylenediamine, tolylenediamine, xylenediamine, and diaminodiphenyl methane.

Among the urea compounds, the diurea compound excellent in heat resistance and shear properties is desirable as the thickener. In addition, since the content of the urea compound is 3 to 8% by mass to ensure the flowability, the compound contains an aliphatic hydrocarbon radical in order to ensure, the consistency.

In the grease enclosed in the fixed type constant velocity universal joint of this embodiment, the paraffinic mineral oil is mainly mixed in view of the cost. Like naphthenic mineral oil, the paraffinic mineral oil is unlikely to flow at a low temperature, but the viscosity of the paraffinic mineral oil subjected to shear becomes smaller than that of the naphthenic mineral oil, with less resistance, which is effective for preventing stick slip.

Examples of the synthetic hydrocarbon oil include a poly-α-olefin and a polybutene. However, low cost grease in which the mixing amount of the expensive synthetic oil is reduced or zero is desirable.

A large mixing amount of ester oil as the base oil is expensive and cannot obtain a proper viscosity, so that the grease contains 0 to 20% by mass, preferably 5 to 20% by mass of ester oil.

A large mixing amount of the naphthenic mineral oil as the base oil is not preferable, for preventing stick slip at low temperatures and abnormal noises at low temperatures, so that the grease contains 20% by mass or less, preferably 10% by mass or less of naphthenic mineral oil.

Preferably, the initial consistency of the grease which is numbered 0 is the lower limit, and the initial consistency of the grease which is numbered 2 is the upper limit. An initial consistency which is numbered above 2 can trouble the lubricated state, and an initial consistency which is numbered below 0 can leak the grease.

EXAMPLES

Hereinafter, examples of the present invention and comparative examples will be described. The compositions of the greases enclosed in the fixed type constant velocity universal joints of the examples and the comparative examples are shown in Table 2. In Table 2, for convenience, the examples and the comparative examples are shown in the section above the compositions of the greases, which means that the examples and the comparative examples are the fixed type constant velocity universal joints which enclose the respective greases. The examples and the comparative examples in Table 2 are all the fixed type constant velocity universal joint of the undercut-free type having eight balls, whose structure has been described in the embodiment.

In the following examples and comparative examples, considering the durability, as the additives, several % by mass of molybdenum dithiocarbamate (MODTC), molybdenum dithiophosphate (MODTP), zinc dithiocarbamate (ZnDTC), zinc dithiophosphate (ZnDTP), and an extreme pressure agent are added, which have a small influence on the prevention of abnormal noises at a low temperature, and the detail is omitted.

The examples and the comparative examples include the components shown in the left section in Table 2. The numerical values in the base oil section in the table of the examples and the comparative examples express contents in terms of % by mass with respect to the total mass of the lubricant component contained as the base oil. The numerical values in the thickener section express contents in terms of % by mass with respect to the total mass of the grease.

The paraffinic mineral oil in the table having a kinematic viscosity of 11 mm$^2$/s (100° C.) and a viscosity index of 98 was used. In Examples 2 and 3, the thickener is a diurea compound in which R1 and R2 are each an aliphatic hydrocarbon radical having 8 carbon atoms. In Examples 1 and 4 to 7 and Comparative Examples 1 to 4, the thickener is a diurea compound in which R1 is an aliphatic hydrocarbon radical having 8 carbon atoms and R2 is an aliphatic hydrocarbon radical having 18 carbon atoms. The poly-α-olefin in the table having a kinematic viscosity of 420 mm$^2$/s at 40° C. was used. The ester oil is a trimellitic acid trialkyl ester (flow point: −50° C., kinematic viscosity at 40° C.: 53 mm$^2$/s).

TABLE 2

|  |  | Example 1 | Example 2 | Example 3 | Example 4 | Example 5 | Example 6 |
|---|---|---|---|---|---|---|---|
| Base oil | Naphthenic mineral oil | 0 | 0 | 0 | 20 | 20 | 20 |
|  | Paraffinic mineral oil | 100 | 95 | 90 | 80 | 70 | 80 |
|  | Poly-α-olefin | 0 | 5 | 5 | 0 | 10 | 0 |
|  | Ester oil | 0 | 0 | 5 | 0 | 0 | 0 |
| Thickener | Kind | C8 + C18 aliphatic | C8 aliphatic | C8 aliphatic | C8 + C18 aliphatic | C8 + C18 aliphatic | C8 + C18 aliphatic |
|  | Content | 6 | 6 | 6 | 8 | 8 | 6 |
| Evaluation item | Abnormal noises at low temperatures | ⊚ | ⊚ | ⊚ | ○ | ○ | ⊚ |
|  | Initial consistency | ○ | ○ | ○ | ○ | ○ | ○ |
|  | Boot swelling properties | △ | △ | ○ | ○ | ○ | ○ |
|  | Cost | ⊚ | ○ | ○ | ⊚ | ○ | ⊚ |

|  |  | Example 7 | Comparative Example 1 | Comparative Example 2 | Comparative Example 3 | Comparative Example 4 |
|---|---|---|---|---|---|---|
| Base oil | Naphthenic mineral oil | 20 | 30 | 0 | 20 | 20 |
|  | Paraffinic mineral oil | 80 | 70 | 0 | 80 | 80 |
|  | Poly-α-olefin | 0 | 0 | 80 | 0 | 0 |
|  | Ester oil | 0 | 0 | 20 | 0 | 0 |
| Thickener | Kind | C8 + C18 aliphatic | C8 + C18 aliphatic | C8 + C18 aliphatic | C8 + C18 aliphatic | C8 + C18 aliphatic |
|  | Content | 3 | 8 | 8 | 10 | 2 |
| Evaluation item | Abnormal noises at low temperatures | ⊚ | X | ⊚ | △ | ⊚ |
|  | Initial consistency | ○ | ○ | ○ | ○ | X |
|  | Boot swelling properties | ○ | ○ | ○ | ○ | ○ |
|  | Cost | ⊚ | ⊚ | X | ⊚ | ⊚ |

Evaluation Test of Abnormal Noises at Low Temperatures

Figure 5:
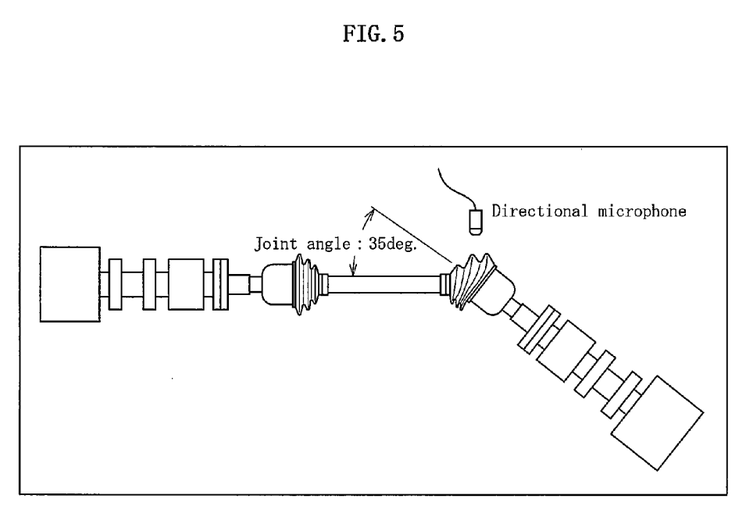
FIG. 5 is a plan view of a testing machine which measures abnormal noises at low temperatures.

A testing machine which measures abnormal noises at low temperatures is shown in FIG. 5. The testing conditions of abnormal noises at low temperatures in the examples and the comparative examples are as follows:

Joint operating angle: 35°
Rotational speed: 200 rpm
Load torque: 500 Nm
Refrigerating temperature: refrigeration at −40° C. for 6 hours or more The temperature in the joints immediately before the test was measured by a thermocouple attached to the inner joint members, thereby measuring abnormal noise levels when the temperature in the joints was −30° C. by a directional microphone. The measured results are shown in Table 2. The evaluation criteria in the table are as follows.

⊚: excellent, ○: good, △: slightly failed, X: failed

First, to examine the influence of the mixing amount of the thickener, with the same base oil in which the grease contains 20% by mass of naphthenic mineral oil and 80% by mass of paraffinic mineral oil, the measured results of abnormal noises at low temperatures and the initial consistency of Examples 4, 6, and 7 and Comparative Examples 3 and 4 in which only the mixing amount of the thickener, which is an aliphatic diurea compound in which R1 has 8 carbon atoms and R2 has 18 carbon atoms, was changed were compared. As a result, it was found that Example 4 in which the amount of the thickener was 8% by mass, Example 6 in which the amount of the thickener was 6% by mass, and Example 7 in which the amount of the thickener was 3% by mass had good evaluation results of abnormal noises at low temperatures, and had no problem in the initial consistency. From the results, it was found that the grease desirably contains 3 to 8% by mass of the thickener.

Next, the measured values of abnormal noises at low temperatures were compared. In addition, the practical evaluation (the initial consistency, the boot swelling properties, and the cost) of the grease was performed.

It was found that Examples 1, 2, 3, 6, and 7 were excellent in preventing abnormal noises at low temperatures. The grease contained 80% by mass or more of the paraffinic mineral oil or a mixture of the paraffinic mineral oil and the synthetic hydrocarbon oil with respect to the total mass of the lubricant component contained as the base oil, which was excellent in the effect of preventing abnormal noises at low temperatures.

The effect of preventing abnormal noises at low temperatures in Examples 4 and 5 was not at the level of Examples 1 to 3, 6, and 7, but was good. In addition, Examples 4 and 5 were good in the initial consistency of the grease, the boot swelling properties, and the cost.

Examples 1 and 2 were slightly failed in the boot swelling properties, but were at the level which has no practical problem.

Comparative Examples 2 and 4 were excellent in preventing abnormal noises at low temperatures, but had the insufficient initial consistency of the grease and had a cost problem. Comparative Examples 1 and 3 were failed in the effect of preventing abnormal noises at low temperatures.

From the results of Examples 4, 6, and 7, it was found that a grease containing 80% by mass of the paraffinic mineral oil with respect to the total mass of the lubricant component contained as the base oil is good in preventing abnormal noises at low temperatures.

In addition, from the result of Example 5, it was found that a grease containing 80% by mass of the paraffinic mineral oil and the poly-α-olefin which is the synthetic hydrocarbon oil with respect to the total mass of the lubricant component contained as the base oil is good in preventing abnormal noises at low temperatures.

From the result of Example 5, it was also found that the base oil advantageous in cost containing 70% by mass of the paraffinic mineral oil and 10% by mass of the poly-α-olefin which is the synthetic hydrocarbon oil with respect to the total mass of the lubricant component is good in preventing abnormal noises at low temperatures.

Table 2 shows the measured results of the fixed type constant velocity universal joint of the undercut-free type having eight balls, but the fixed type constant velocity universal joint of the undercut-free type having six balls also has the effect of preventing abnormal noises at low temperatures.

Figure 4:
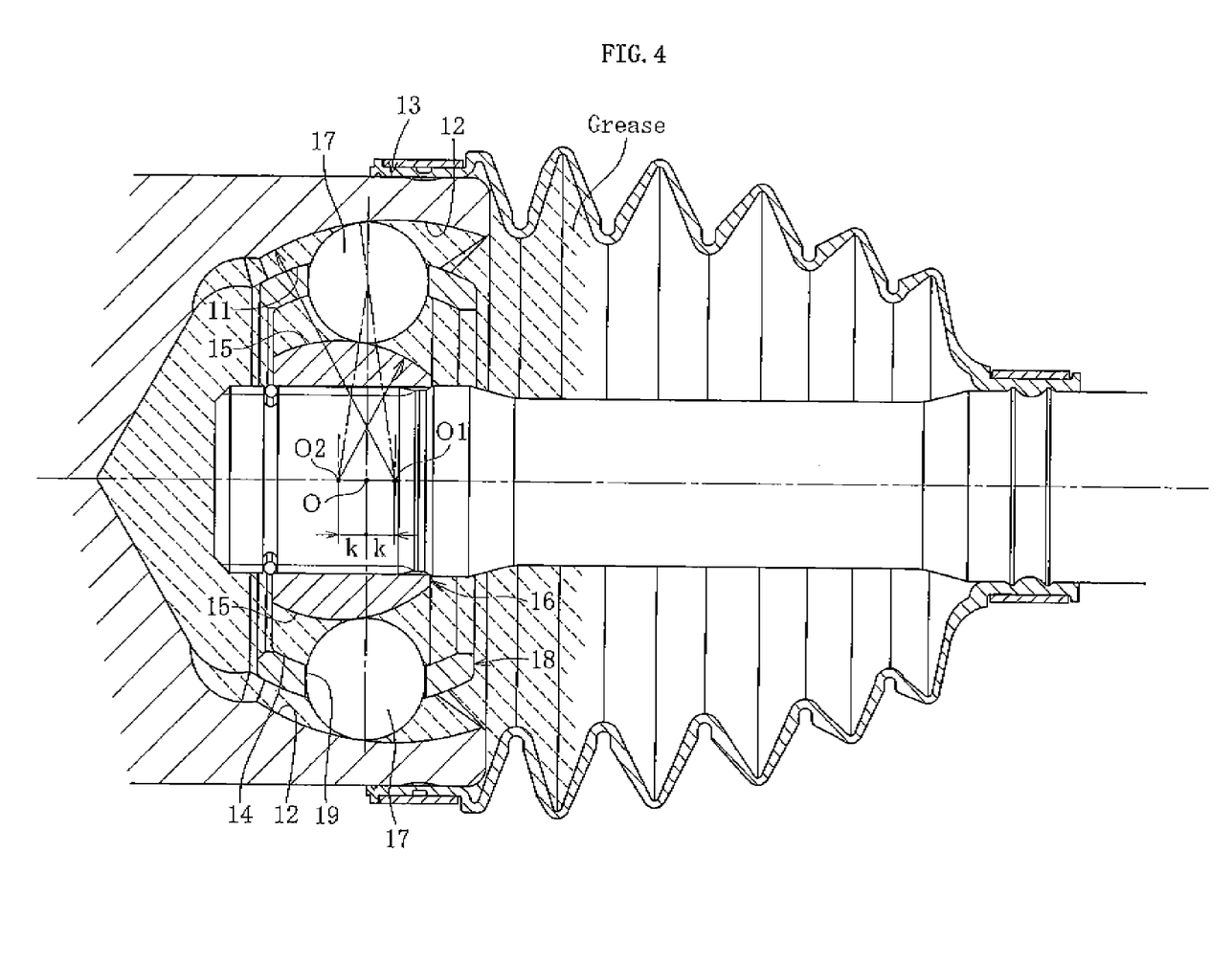
FIG. 4 is a longitudinal sectional view of the fixed type constant velocity universal joint having track grooves formed only of circular arc portions in the axial direction.

In addition, as shown in FIG. 4, the Rzeppa type constant velocity universal joint in which the track grooves are formed only of the circular arc portions has the amount of slip according to the circumferential speed difference caused between the contact point of the track grooves of the outer joint member and the balls and the contact point of the track grooves of the inner joint member and the balls, which is the same as the fixed type constant velocity universal joint of the undercut-free type, thereby having the effect of preventing abnormal noises at low temperatures.

DESCRIPTION OF REFERENCE SIGNS

21: Spherical inner surface
22: Track groove
22a: Straight portion
22b: Circular arc portion
23: Outer joint member
24: Spherical outer surface
25: Track groove
25a: Straight portion
25b: Circular arc portion
26: Inner joint member
27: Ball
28: Cage
28a: Spherical outer surface
28b: Spherical inner surface
O: Joint center
O1: Center of curvature of the circular arc portions of the track grooves of the outer joint member
O2: Center of curvature of the circular arc portions of the track grooves of the inner joint member
O5: Ball center

The invention claimed is:

1. A fixed type constant velocity universal joint comprising:
an outer joint member having an inner surface in which a plurality of track grooves are formed;
an inner joint member having an outer circumferential surface in which a plurality of track grooves are formed;
a plurality of balls for transmitting torque provided between the track grooves of the outer joint member and the track grooves of the inner joint member;
a cage for retaining the balls; and
a grease enclosed in the fixed type constant velocity universal joint for preventing abnormal noises from occurring at low temperatures,
wherein the grease includes a thickener and a lubricant component which is constituted by base oil,
wherein the grease contains 90% by mass or more of paraffinic mineral oil with respect to the total mass of the lubricant component of the grease,
wherein the grease contains 3 to 8% by mass of the thickener with respect to the total mass of the components of the grease,
wherein the fixed type constant velocity universal joint is coupled to driving wheels of a front wheel drive shaft, and
wherein the grease is enclosed in the fixed type constant velocity universal joint for preventing abnormal noises from occurring at low temperatures of −20° C. or lower.

2. The fixed type constant velocity universal joint of claim 1, wherein the thickener of the grease is a urea compound and has a consistency numbered 0 to 2.

3. The fixed type constant velocity universal joint of claim 1, wherein each of the track grooves of the outer joint member and the inner joint member is formed only of a circular arc portion in the axial direction.

4. The fixed type constant velocity universal joint of claim 1, wherein each of the track grooves of the outer joint member and the inner joint member includes a circular arc portion and a straight portion in the axial direction.

5. The fixed type constant velocity universal joint of claim 1, wherein the number of the track grooves of each of the outer joint member and the inner joint member is eight, and the number of the balls provided between the opposite track grooves of the outer joint member and the inner joint member is eight.

6. The fixed type constant velocity universal joint of claim 1, wherein the grease contains 5% by mass of ester oil with respect to the total mass of the lubricant component of the grease.

7. The fixed type constant velocity universal joint of claim 6, wherein the grease contains 5% by mass of poly-α-olefin oil with respect to the total mass of the lubricant component of the grease.

8. The fixed type constant velocity universal joint of claim 7, wherein the thickener of the grease is a urea compound and has a consistency numbered 0 to 2.

9. The fixed type constant velocity universal joint of claim 1, wherein the grease contains 5% by mass of poly-α-olefin oil with respect to the total mass of the lubricant component of the grease.

10. A fixed type constant velocity universal joint comprising:
an outer joint member having an inner surface in which a plurality of track grooves are formed;
an inner joint member having an outer circumferential surface in which a plurality of track grooves are formed;
a plurality of balls for transmitting torque provided between the track grooves of the outer joint member and the track grooves of the inner joint member;
a cage for retaining the balls; and
a grease enclosed in the fixed type constant velocity universal joint for preventing abnormal noises from occurring at low temperatures,
wherein the grease includes a thickener and a lubricant component which is constituted by base oil,
wherein the grease contains 90% by mass or more of paraffinic mineral oil with respect to the total mass of the lubricant component of the grease,
wherein the grease contains 3 to 8% by mass of the thickener with respect to the total mass of the components of the grease, and
wherein the grease contains 5% by mass of synthetic hydrocarbon oil with respect to the total mass of the lubricant component of the grease.

11. The fixed type constant velocity universal joint of claim 10, wherein the thickener of the grease is a urea compound and has a consistency numbered 0 to 2.

12. The fixed type constant velocity universal joint of claim 10, wherein each of the track grooves of the outer joint member and the inner joint member is formed only of a circular arc portion in the axial direction.

13. The fixed type constant velocity universal joint of claim 10, wherein each of the track grooves of the outer joint member and the inner joint member includes a circular arc portion and a straight portion in the axial direction.

14. The fixed type constant velocity universal joint of claim 10, wherein the number of the track grooves of each of the outer joint member and the inner joint member is eight, and the number of the balls provided between the opposite track grooves of the outer joint member and the inner joint member is eight.

15. The fixed type constant velocity universal joint of claim 10, wherein the grease contains 5% by mass of ester oil with respect to the total mass of the lubricant component of the grease.

\* \* \* \* \*